United States Patent [19]
Carlson et al.

[11] 3,907,794
[45] Sept. 23, 1975

[54] TREATMENT OF CHLORINATED ISOCYANURATE WASTE STREAMS

[75] Inventors: Ronald H. Carlson, Willingboro; Raymond N. Mesiah, Somerset, both of N.J.

[73] Assignee: FMC Corporation, New York, N.Y.

[22] Filed: Jan. 4, 1974

[21] Appl. No.: 430,914

[52] U.S. Cl.................... 260/248 A; 260/248
[51] Int. Cl................................. C07d 55/36
[58] Field of Search............. 423/365; 260/248 A

[56] References Cited
UNITED STATES PATENTS
3,065,233  11/1962  Hopkins et al............... 260/248
3,835,136  9/1974  Hirdler et al................ 260/248
3,846,424  11/1974  Hirdler et al................ 260/248

*Primary Examiner*—John M. Ford

[57] ABSTRACT

Aqueous waste streams containing dissolved chlorinated isocyanurate values, that is, chlorinated isocyanuric acids and their salts, are treated with a compound selected from the group consisting of sulfur dioxide and an alkali metal sulfur-containing reducing compound to dechlorinate and precipitate the isocyanurate values therefrom. The treatment effects recovery of isocyanurate values, and is an effective pollution control means which can operate with existing commercial facilities.

7 Claims, No Drawings

TREATMENT OF CHLORINATED ISOCYANURATE WASTE STREAMS

This invention relates to the purification of aqueous waste streams containing chlorinated isocyanurate values, that is, chlorinated isocyanuric acids and their salts.

The chlorinated isocyanuric acids and their salts are well known as a source of active chlorine. They are widely used to treat water supplies to prevent the growth of pathogenic bacteria and are used in detergent, bleaching and sanitizing compositions. The most popular of these compounds are dichloroisocyanuric acid, trichloroisocyanuric acid, sodium dichloroisocyanurate, and potassium dichloroisocyanurate. These compounds have found wide acceptance because they are relatively stable under ambient conditions and they are capable of giving off their active chlorine when placed in aqueous solutions intended for bleaching, disinfecting or germicidal action.

Dichloroisocyanuric acid is conventionally prepared by adding elemental chlorine to an alkali metal salt of isocyanuric acid under controlled reaction conditions as illustrated by the following equation:

$$C_3N_3O_3H_3 + 2NaOH + 2Cl_2 \rightarrow C_3N_3O_3HCl_2 + 2NaCl + 2H_2O$$

Trichloroisocyanuric acid is prepared in the same way except that 3 moles each of the alkali metal hydroxide and chlorine are used per mole of isocyanuric acid.

Sodium dichloroisocyanurate is conventionally prepared by reacting dichloroisocyanuric acid with sodium hydroxide under controlled conditions as illustrated by the following equation:

$$C_3N_3O_3HCl_2 + NaOH \rightarrow C_3N_3O_3NaCl_2 + H_2O$$

In similar manner, the potassium salt is produced by using potassium hydroxide in place of sodium hydroxide. Patents which disclose these processes are U.S. Pat. Nos. 2,969,360; 3,035,056; and 3,289,312.

After the termination of these reactions, the resultant aqueous slurry of chlorinated isocyanuric acids or their salts are treated in separatory equipment to remove the solids from their mother liquor, that is, by filtration or centrifugation. The mother liquor (filtrate) separated from the solids is then discarded as an aqueous waste stream.

The filtrate remaining from the production of dichloroisocyanuric acid and/or trichloroisocyanuric acid generally has a pH from about 0.5 to about 5.5 and contains up to about 2.0% dissolved chlorinated isocyanuric acids. The filtrate remaining from the production of sodium dichloroisocyanurate and potassium dichloroisocyanurate generally has a pH from about 5.5 to about 7.0 and contains up to about 25.0% dissolved chlorinated alkali metal isocyanurate salts.

In addition to dissolved chlorinated isocyanurate values, other water-soluble, non-chlorinated compounds are present in the aqueous waste streams. In general, the non-chlorinated compounds constitute about 7 to 12% of the waste stream wherein about 6 to 11% is sodium chloride.

While the prior mentioned patented processes have been entirely satisfactory for the production of chlorinated isocyanuric acids and their salts, satisfactory means for treating the aqueous waste streams is lacking. A commercially efficient and commercially practical method for treating these waste streams is necessary not only to recover the valuable isocyanurate values dissolved in the waste streams now being discarded, but more importantly, to produce plant effluents that are essentially pollution-free.

It has been unexpectedly discovered that aqueous waste streams having a pH from about 0.5 to about 7.0 and containing dissolved therein chlorinated isocyanurate values can be contacted with a compound selected from the group consisting of sulfur dioxide and an alkali metal sulfur-containing reducing compound at a pH from about 0.5 to about 12.0 to dechlorinate the chlorinated isocyanurate values and to recover the isocyanurate values therefrom. The term isocyanurate values used herein refers to cyanuric acid, isocyanuric acid, alkali metal isocyanurate salts, and combinations thereof.

To practice the invention, sufficient sulfur dioxide and/or an alkali metal sulfur-containing reducing compound is added to the waste stream to chemically reduce the chlorinated isocyanurates to cyanuric acid, isocyanuric acid or their salts which precipitate from the reaction mixture. These precipitates are recovered by conventional recovery methods, such as by filtration, centrifugation or the like. The recovered isocyanurate values can then be recycled back to the chlorination zone to produce more chlorinated isocyanurate values. The resulting filtrate may be discarded as waste with virtually no detrimental impact on natural fauna or flora.

The aqueous waste streams are contacted with sulfur dioxide and the alkali metal sulfur-containing reducing compound at a pH from about 0.5 to about 12.0. When the pH of the treated waste stream is on the acid side, the precipitated isocyanurate values consist mainly of cyanuric or isocyanuric acid. When the pH of the treated waste stream is on the neutral to alkali side, the precipitated isocyanurate values consist mainly of alkali metal isocyanurate salts. The mono-alkali metal salt is the principal product at a pH near 7.5, while the di-alkali metal salt is the principal product at a pH near 12. Mixtures of the two salts are formed at intermediate pH levels.

Since untreated waste streams have a pH from about 0.5 to about 7.0, alkali metal hydroxides are employed to raise the pH above about 7.0 prior to or simultaneously with the treatment with sulfur dioxide and/or the alkali metal sulfur-containing reducing compound. The alkali metal hydroxides are preferably sodium hydroxide or potassium hydroxide. When employing alkali metal hydroxides the particular alkali metal employed is the same alkali metal present in the sulfur-containing compound which also corresponds with any alkali metal present in the chlorinated isocyanurate values.

The most preferred pH for carrying out the invention is at a pH from about 5.5 to about 12.0. These higher pH's are preferred over the lower acidic pH's since more isocyanurate values can be recovered from the waste stream. Generally, the solubility of isocyanuric acid in the treated waste stream is 0.3% at pH's below about 5.5. The solubility of the alkali metal isocyanurate salts, however, is about 0.02 to 0.05% at pH's above about 5.5. Additional advantages which result from employing these higher pH's are (1) increased solubilization of sulfur dioxide, (2) more efficient dechlorination, (3) decreased formation of nitrogen trichloride, and (4) faster rate of reaction.

The dechlorination of chlorinated isocyanurate values with the compounds of this invention is an oxidation-reduction reaction wherein sulfur is oxidized from a plus four or lower valence to a plus six valence while chlorine is reduced from a plus one valence to a minus one valence. Accordingly, the sulfur-containing compounds must be reducing compounds. Furthermore, the sulfur-containing compounds are preferably alkali metal salts. The preferred alkali metal salts are sodium and potassium. Exemplication of some of the sulfur-containing reducing compounds which are employed in the invention are: sodium sulfite; sodium bisulfite; sodium dithionite; sodium metabisulfite; potassium sulfite; potassium bisulfite; and potassium metabisulfite.

Sulfur dioxide is conveniently used by merely passing sulfur dioxide gas into the aqueous waste stream until the active chlorine in the waste stream is destroyed. The alkali metal sulfur-containing reducing compounds are conveniently used as an aqueous solution which is added to the aqueous waste stream. Agitation may be employed for optimum results.

Generally, the amount of sulfur dioxide and/or alkali metal sulfur-containing reducing compound employed is the stoichiometric amount required to convert 1 mole of chlorinated isocyanurate values to 1 mole of isocyanurate values. For example, 1 mole of dichloroisocyanuric acid will be converted to 1 mole of isocyanuric acid by 2 moles of sodium sulfite or two moles of sodium bisulfite or 1 mole of sodium metabisulfite. Preferably, an excess amount of about 10% above the stoichiometric amount is employed for optimum results.

The process of the invention can be carried out at any temperature in which the aqueous waste stream is in a liquid state. Operating temperatures normally range from about 0° to about 90°C, and preferably from about 5° to about 40°C. Reaction times vary from two minutes to two hours depending upon the reaction temperature, reaction pH, and reducing compound employed.

The following examples are given to illustrate the invention, but are not deemed to be limiting thereof. All percentages given are based upon weight unless otherwise indicated.

EXAMPLE 1

One liter of a synthetic aqueous waste solution simulating commercially produced dichloroisocyanuric acid waste effluents was prepared by dissolving 9 grams (0.045 mole) of dichloroisocyanuric acid and 70 grams of sodium chloride in tap water. This solution was poured into a 1,500 ml beaker fitted with a magnetic stirrer, cooled to 25°C and the pH adjusted to 9.0 with a 50% solution of sodium hydroxide. Sulfur dioxide was then bubbled into the solution for 15 minutes. During this time, the pH was maintained at 9.0 by sodium hydroxide addition, and large quantities of white solids precipitated. A total of 5.8 grams (0.09 mole) of sulfur dioxide was added. The precipitate was filtered at 25°C, washed with 25 ml of chilled distilled water and oven dried at 120°C for 2 hours. After drying, the product weighed 6.5 grams and analyzed greater than 99% monosodium cyanurate monohydrate which represents a 85% recovery of isocyanurate values.

EXAMPLE 2

One liter of a synthetic aqueous waste solution simulating commercially produced sodium dichloroisocyanurate waste effluents was prepared. The solution contained 58.2 grams (0.227 mole) of sodium dichloroisocyanurate dihydrate. This solution was treated according to the procedure of Example 1 with sulfur dioxide for 1 hour. During the reaction, the pH was maintained at 9.0 with sodium hydroxide, and a precipitate formed. A total of 29 grams (0.45 mole) of sulfur dioxide was added. The precipitate was filtered at 15°C, washed and dried. After drying, the product weighed 35.1 grams and analyzed greater than 99% monosodium cyanurate monohydrate which represents a 92% recovery of isocyanurate values.

EXAMPLE 3

A synthetic aqueous waste solution was prepared according to Example 1. To this solution was added 8.64 grams (0.045 mole) of sodium metabisulfite dissolved in 100 ml of water. The reaction mixture was stirred for about 10 minutes. During this time, the pH was maintained at 9.0 by adding sodium hydroxide, and large quantities of a precipitate formed. The precipitate was filtered at 26°C, washed and dried. After drying, the product weighed 6.4 grams and analyzed greater than 99% monosodium cyanurate monohydrate which represents a 83% recovery of isocyanurate values.

EXAMPLE 4

One liter of an aqueous solution containing 9 grams (0.045 mole) of dichloroisocyanuric acid and 1.0 gram (0.0043 mole) of trichloroisocyanuric acid was poured into a 2-liter beaker fitted with a magnetic stirrer and cooled to 10°C. Sulfur dioxide was bubbled into the solution for 5 minutes resulting in the addition of 6 grams (0.093 mole) of sulfur dioxide to the solution. The pH of the solution decreased from 3.2 to 0.6, and large quantities of white solids precipitated. The precipitate was filtered, washed with 50 ml of water and dried. After drying, the product weighed 4.96 grams and analyzed 99.6% cyanuric acid which represents a 78% recovery of isocyanuric acid values.

EXAMPLE 5

One liter of an aqueous solution containing 9 grams (0.045 mole) of dichloroisocyanuric acid was cooled to 10°C in a 2-liter beaker fitted with a magnetic stirrer. Sulfur dioxide was bubbled into the solution for 93 minutes resulting in the addition of 6 grams (0.093 mole) of sulfur dioxide to the solution. The pH of the solution decreased from 2.60 to 0.7, and large quantities of white solids precipitated. The precipitate was filtered, washed with 50 ml of water and dried. The dried product weighed 4.5 grams and analyzed 99.9% cyanuric acid which represents a 77% recovery of isocyanuric acid values.

EXAMPLE 6

One liter of an aqueous solution containing 9 grams (0.045 mole) dichloroisocyanuric acid was cooled to 10°C in a 2-liter beaker fitted with a magnetic stirrer. To this solution was added 11.5 grams (0.091 mole) of sodium sulfite dissolved in 100 ml of water. The reaction mixture was stirred for about 30 minutes. During this time the pH decreased from 2.70 to 1.55, and a white precipitate formed. The precipitate was filtered, washed with 50 ml of water and dried. The dried product weighed 3.8 grams and analyzed greater than 99% cyanuric acid which represents a 66% recovery of isocyanuric acid values.

EXAMPLE 7

The procedure of Example 5 was repeated except that 9.5 grams (0.091 mole) of sodium bisulfite dissolved in 100 ml of water was added in place of sulfur dioxide. During the reaction the pH decreased from 2.60 to 1.15, and a white precipitate formed. The dried product weighed 4.3 grams and analyzed greater than 99% cyanuric acid which represents a 74% recovery of isocyanuric acid values.

EXAMPLE 8

The procedure of Example 5 was repeated except that 5.2 grams (0.03 mole) of sodium dithionite ($Na_2S_2O_4$) dissolved in 100 ml of water was added in place of sulfur dioxide. During the reaction the pH decreased from 2.75 to 1.20, and a white precipitate formed. The dried product weighed 4.2 grams and analyzed greater than 99% cyanuric acid which represents a 72% recovery of isocyanuric acid values.

EXAMPLE 9

The procedure of Example 5 was repeated except that 8.64 grams (0.045 mole) of sodium meta bisulfite ($Na_2S_2O_5$) dissolved in 100 ml of water was added in place of sulfur dioxide. During the reaction the pH decreased from 2.72 to 1.23, and a white precipitate formed. The dried product weighed 3.8 grams and analyzed greater than 99% cyanuric acid which represents a 66% recovery of isocyanuric acid values.

The invention being thus described, it will be obvious that the same may be varied in many ways, such variations are not to be regarded as a departure from the spirit and scope of the invention, and all such modifications are intended to be included within the scope of the following claims.

What is claimed is:

1. A process for recovering isocyanurate values from an aqueous waste stream having a pH from about 0.5 to about 7.0 and containing dissolved therein chlorinated isocyanurate values, which comprises: contacting said waste stream with a compound selected from the group consisting of (a) sulfur dioxide and (b) an alkali metal sulfur-containing reducing compound at a pH from about 0.5 to about 12.0 to dechlorinate the chlorinated isocyanurate values, and recovering the isocyanurate values therefrom.

2. The process of claim 1 wherein the alkali metal is selected from the group consisting of sodium and potassium.

3. The process of claim 1 wherein the sulfur-containing reducing compound is selected from the group consisting of sodium sulfite, sodium bisulfite, sodium dithionite, sodium meta bisulfite, potassium sulfite, potassium bisulfite and potassium meta bisulfite.

4. The process of claim 1 wherein the isocyanurate values are predominantly recovered as isocyanurate salts at a pH from about 5.5 to about 12.0.

5. The process of claim 1 wherein the isocyanurate values are predominantly recovered as isocyanuric acid at a pH from about 0.5 to about 5.5.

6. The process of claim 1 wherein the waste stream has a pH from about 0.5 to about 5.0 and contains up to about 2.0% dissolved chlorinated isocyanuric acids.

7. The process of claim 1 wherein the waste stream has a pH from about 5.5 to about 7.0 and contains up to about 25% dissolved chlorinated alkali metal isocyanurate salts.

* * * * *